US005473741A

United States Patent [19]
Neufelder et al.

[11] Patent Number: 5,473,741
[45] Date of Patent: Dec. 5, 1995

[54] METHOD FOR DETERMINING THE TIME TO PERFORM RASTER IMAGE PROCESSING

[75] Inventors: Thomas J. Neufelder; Ann M. Neufelder, both of Hebron, Ky.

[73] Assignee: Graphic Systems Technology, Inc., Hebron, Ky.

[21] Appl. No.: 113,734

[22] Filed: Aug. 30, 1993

[51] Int. Cl.$^6$ .................................................. G06T 3/60
[52] U.S. Cl. .......................... 395/137; 395/138; 395/139
[58] Field of Search ...................................... 395/128, 118

[56] References Cited

U.S. PATENT DOCUMENTS

| | | | |
|---|---|---|---|
| 3,702,005 | 10/1972 | Ingalls, Jr. | 395/575 |
| 4,771,340 | 9/1988 | Notermans | 358/296 |
| 5,121,494 | 6/1992 | Dias et al. | 395/600 |
| 5,122,873 | 6/1992 | Golin | 348/390 |
| 5,138,561 | 8/1992 | Crowe | 395/103 |
| 5,161,225 | 11/1992 | Abraham et al. | 395/600 |
| 5,206,916 | 4/1993 | Castelaz | 382/14 |
| 5,210,824 | 5/1993 | Putz et al. | 395/145 |
| 5,262,968 | 11/1993 | Coffield | 364/604 |
| 5,274,461 | 12/1993 | Mitsuhashi | 358/296 |
| 5,349,682 | 9/1994 | Rosenberry | 395/800 |

Primary Examiner—Heather R. Herndon
Assistant Examiner—Jody R. Wingard
Attorney, Agent, or Firm—Frost & Jacobs

[57] ABSTRACT

A method is provided for determining the approximate time required to perform Raster Image Processing (RIP) of page description language file, such as PostScrip™ files, which is useful information before the actual RIP is scheduled to be executed. The provided method takes elements of image data and determines the estimated time for processing that image data (via RIP) into a format that can be used by an imagesetter. A timing data profile is created based upon information determined by actual RIPing certain page description language test data files. This timing data profile can be used to estimate the actual time required to perform RIPing of an actual page description language file. The actual page description language file (that is to be printed) is then compared to the timing data profile in different steps: for scanned images, comparisons are made with all non-scaled, non-rotated, scaled, and rotated elements of the actual page description language file. For computer generated data, comparisons are performed for graduated fills, patterned fills, and radial fills. In addition, other characteristics of the actual page language file are analyzed to determine criteria such as the total file size and the number of plates or pages to be processed.

12 Claims, 2 Drawing Sheets

METHOD FOR DETERMINING THE TIME TO PERFORM RASTER IMAGE PROCESSING

TECHNICAL FIELD

The present invention relates generally to color printing equipment and is particularly directed to establishing the amount of time required to perform image processing of various pre-printing applications. The invention is specifically disclosed as a method for determining the time required to perform raster image processing of page description language files within reasonable accuracy without actually performing the rather lengthy task of raster image processing.

BACKGROUND OF THE INVENTION

To perform color printing, the priming industry has historically used photomechanical processing in which a color photograph is separated into four typical colors by use of color filters. Each of these four colors would then be used in creating a film which is further used to create a plate used in actual four-color priming processes. Conventional printing uses a combination of impression plates and inks applied either directly or through an intermediate level to transfer an image from the plates to the final paper or media. In typical four-color priming, the ink colors used are: yellow, magenta, cyan and black.

The production of the impression plates has historically been achieved through a photomechanical process whereby color filters were used in conjunction with a camera to produce the four "separations" corresponding to the appropriate levels of each color ink in the image to be reproduced. If the final page to be printed included text, the content of the text would be typeset and photographed. The film thereby created would be superimposed by hand onto the black color separation and a new final film shot for the black plate.

With the introduction of sophisticated electronics, much of this process can now be automated. The images (such as photographs) are scanned electronically by a digital imager, which produces data values for each of the four color separations, and these data values can be stored in a computer. The resulting electronic images are sent to a page composition station where an operator places the image and includes any text or other artwork (again by using a computer), to create a format of a final page which is to be printed. Such other artwork can include computer generated images, such as "patterned fills," and "graduated fills," etc.

The final page is now in an electronic format which can be sent to an output device to expose one set of films with all information included. All of the different types of images and other data are combined into a "page description language" file which can be further processed, and has flexibility for making later changes in the page's appearance. One important feature of this electronic format is that it can be edited simply by operation of the computer while observing the prospective final product on the computer's color display. In other words, images can be moved, scaled, and rotated, text can be moved or changed, and computer generated images can be edited, etc., all without any changes made to any physical film or plate.

The above output device typically cannot simply use this electronic format to create films, but must interpret the data in the particular input page description language file before acting upon that data. As the output device interprets the input file, it creates a rasterized file of "on-off" values for the film exposing unit. The device which performs the interpretation is typically called a Raster Image Processor ("RIP"), and the exposure device is often referred to as the "marking engine." The RIP function is typically performed by a "service bureau," which is a company that specializes in taking customers' data (page description language) files and creating the films needed for final color printing production. This process is described in greater detail, hereinbelow.

To create a page description language file, a computer programming language is used to accept commands and data used to specify imaging and other criteria. One such computer programming page description language is PostScript™ which can be used include all the above types of images and other data to represent various elements of such images and data that will be used in the printed page. Examples of computer programs that can generate PostScript™ code are (1) Adobe Illustrator™, (2) Aldus Freehand™, (3) Quark XPress™, and (4) Aldus Pagemaker™. A PostScript™ data file which contains the data used to create the color pages must be converted into bit patterns (or "rasterized"), which is typically performed by a Raster Image Processing device. These bit patterns control the exposing of the film for a particular color by an imagesetter.

The purpose of the rasterizing is to convert all the elements of a page description language file into bitmat pixels before printing. This is required because imagesetters can only print dots on paper or film. Other types of image processing (than rasterization) include applying specific filters to images to create special effects, and rendering (which is a type of rasterization) to create a three-dimensional effect on a two-dimensional page. In addition, certain post-processing steps, such as image enhancement, can be performed upon bitmat pixels before printing. An example of a computer program that performs Raster Image Processing is Adobe CPSI™, which is a configurable PostScript™ interpreter, and is manufactured by Adobe Systems, Inc. located in Mountain View, Calif.

SUMMARY OF THE INVENTION

Accordingly, it is a primary object of the present invention to provide a method for estimating the time required in Raster Image Processing of a page description language file, without performing the actual Raster Image Process step.

It is another object of the present invention to provide a method of estimating the time required to apply specific filters to images to create special effects, without performing the actual step of filtering.

It is a further object of the present invention to provide a method for estimating the time required for rendering a three-dimensional image from various data elements, without performing the actual rendering step.

It is yet another object of the present invention to provide a method for estimating the time required to execute certain post-processing functions, such as colorizing gray scale (black-and-white) images, or false coloring of images.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved method for estimating time of image processing is provided which can take elements of image data and determine the estimated time for processing that image data into a format that can be used by an imagesetter. In one preferred embodiment, a timing data profile (a structure or file of test data) is created based upon information determined by actual Raster Image Processing of certain page description language test data files. This timing data profile can be used to estimate the actual time required to perform Raster Image Processing of an actual page description language file. The actual page description language file (that is to be printed) is sampled and then compared to the timing data profile in different steps: for scanned images, comparisons are made with all non-scaled, non-rotated, scaled, and rotated elements of the actual page description language file. For computer generated data, comparisons are performed for graduated fills, patterned fills, and radial fills. In addition, other characteristics of the actual page language file are measured and analyzed to determine criteria such as the total file size and the number of plates or pages to be processed. All the above timing intervals are combined to determine the total estimate of time to perform actual image processing.

In a variation of the first preferred embodiment, the timing data profile is determined from manufacturer's data rather than from information gleaned by performing actual Raster Image Processing of test data files. Such manufacturer's data may be difficult to find, however, the original software manufacturer of a PostScript™ interpreter, for example, would certainly have that information available. Once this alternatively-created timing data profile is created, a similar comparison is made between the timing data profile and the actual page description language file (that is to be printed) to determine the estimated RIPing time.

In a second variation of the first preferred embodiment, a stand-alone apparatus is used to both create the page description language files and to print the final document. In this instance, a timing data profile is determined either from manufacturer's data or from performing certain of the processing steps (on test data files) needed to create the final printed document by the stand-alone apparatus.

In a second preferred embodiment, a method is provided for estimating the time required to apply a specific filter to an image to create a special effect. Examples of such special effects are paint brush stroke, charcoal, pencil, water colors, and embossed appearances. These filters could also be analytical functions capable of enhancing characteristics such as contrast, detail, and dynamic range.

In addition, a third preferred embodiment provides a method that estimates the time required for rendering a three-dimensional image from data elements such as two-dimensional images to have their depth enhanced. In addition, texture can be applied, shadowing effects can be added, and/or light sources can be added.

A fourth preferred embodiment provides a method for estimating the time required to perform certain post-processing functions to image data. Examples of such post-processing functions are creating false color images or increased contrast of raw imaged data (such as raw infrared photographs), and colorizing gray scale images.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
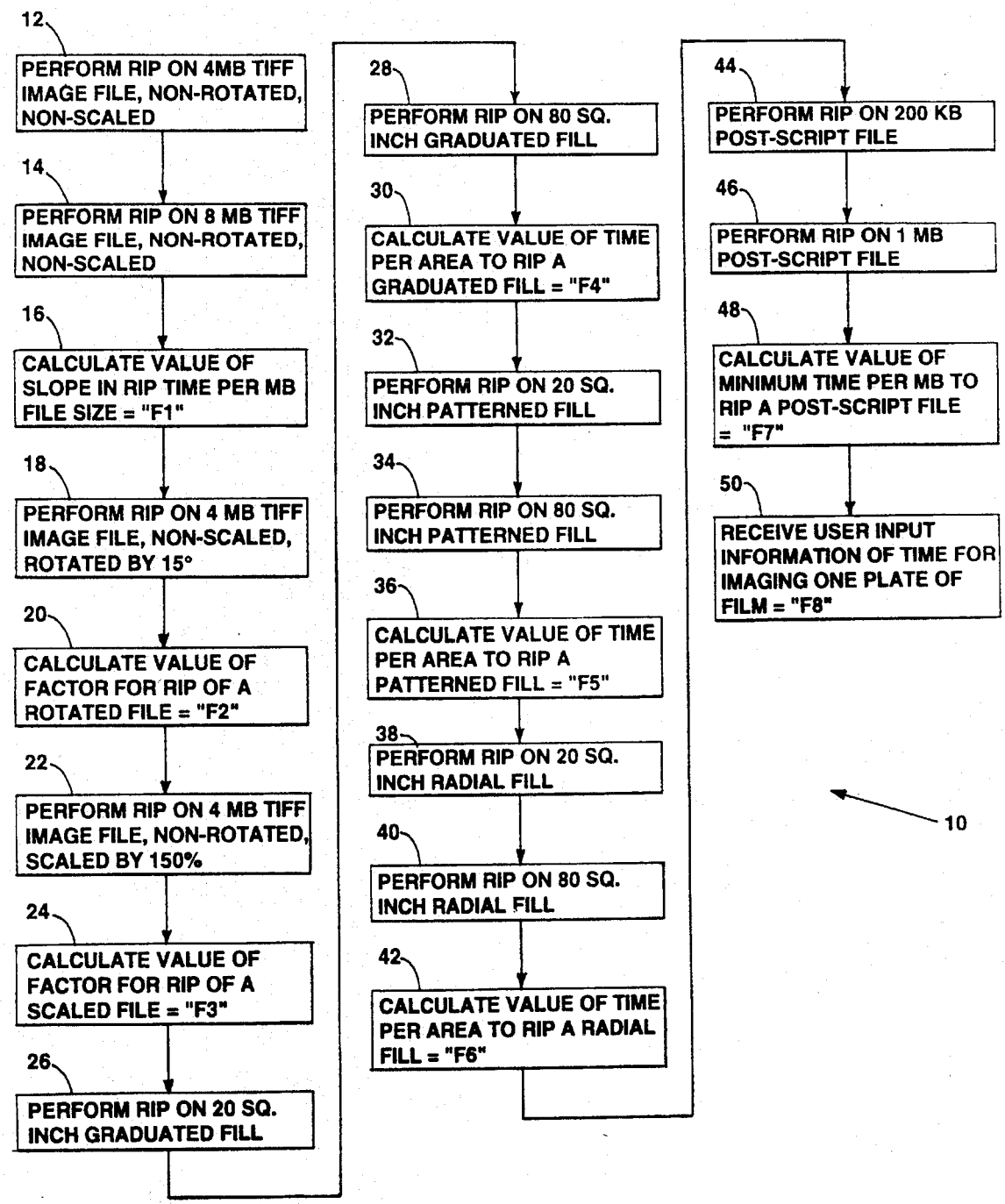
FIG. 1 a flow chart depicting a series of characterization tests which are used to provide necessary data that will be utilized by the method of the present invention.

Referring now to the drawings, FIG. 1 shows a flow chart generally designated by the index numeral 10 which includes a series of function blocks representing a set of characterization tests that are required to provide data for later steps in determining the total estimated processing time of a page description language file. It is preferred that the method of the present invention be performed on a computer (not shown) and that the results of all tests and calculations be stored in the memory of that computer for use in later steps of the present method. It will be understood that the method steps can be performed by means other than a computer.

An example of a page description language file is a file that is formatted to operate with the computer programming language PostScript™, which is a standard language used in the pre-printing industry-that can be used to process both text and image information. PostScript™ is used to create page formats during the page design and production step of the pre-printing process. When using a PostScript™ language, or some other type of page composition computer program that can generate code similar to PostScript™, a designer can create an electronic file (the page description language file) that contains the planned design on his computer, and this design can include text data, computer generated data, and imaged data. Once the page description language file is completed, a PostScrip™ interpreter computer program is typically used to convert the page description language file into a format useful in creating color "films" or "plates." This procedure is described in greater detail hereinbelow.

Imaged data enters the computer's memory by electronically scanning a photograph or a slide which becomes converted into a bitmapped image, consisting of a large number of picture elements (also called "pixels"). Using a PostScript™ code generating language, the designer at the computer terminal can perform the "layout" function by moving the imaged photograph or slide to any location upon a given future page, along with any associated text or computer generated images. Once in the computer, these files can be output to color printers of sufficient quality to be used for proofreading and for preliminary approval by the client. As related above, examples of PostScript™ code generating computer programs are: (1) Adobe Illustrator, (2)

Aldus Freehand, (3) Quark XPress™, and (4) Aldus Pagemaker,

For use in a high production printing process, however, these computer language files cannot be directly used to mass produce thousands or tens of thousands of copies for magazines or books. For such high volume printing, a "service bureau" acts as a film preparer and stripper, in which the films are required for use in a high speed, high production capacity, four-color printing process. The films are used to generate metal plates, one for each of the four colors used in the color printing process. Each of these color plates is used in depositing its particular ink color onto the actual printed page, one color at a time. Once all four plates have been used with their respective colors applied to the paper, the final printed product is complete. Since printing with color inks is subtractive (rather than additive, as in the use of color light), the typical colors used are yellow, magenta, and cyan, along with black. These colors are the opposite of the electromagnetic radiated light primary colors of red, green, and blue. It will be understood that other colors may be added or substituted for the four colors typically used. In fact, in certain highly detailed printing applications, over ten (10) colors are used.

To automatically convert PostScript™ page description language code into a data file which can be used by a film processing machine (to make films which later become plates), the PostScript™ instructions must be converted into a bitmapped image for each of the four color inks at the resolution of the selected output device. The apparatus required for this conversion is known as a Raster Image Processor (RIP), which takes the pixel images and other data of the PostScript™ file and converts them to a series of instructions that determine whether or not ink of a particular color is to be placed along certain locations of each of the horizontal lines that make up the raster, starting at the top of the page and continuing down, line-by-line, to the bottom of the page. The RIP function is typically performed by a computer program known as an "interpreter." One example, noted above, of such an interpreter that will RIP a PostScript™ page description language file is Adobe CPSI™, which is a configurable PostScript™ interpreter. This conversion process by the RIP apparatus can take a very long time, measured in hours or tens of hours for the several pages required to make up a particular printed document.

The method of the present invention allows the operator of a service bureau, whose business is to prepare the above films from PostScript™ files, to have a reasonably accurate estimate as to how long it will take for a particular set of PostScript™ data to be converted by the RIP into the bitmapped data required for the film- or plate-making machine. This process of conversion is also known as "RIPing".

Flow chart 10 describes a method that performs a series of characterization tests which creates a timing data profile (a structure or file of test data) used in the present invention's method for estimating the RIPing time. Certain sample image files are required to provide the necessary data for these characterization tests used in flow chart 10. Image files known as "TIFF" (Tagged Image File Format) files are preferably used in providing the necessary data for these characterization tests. Depending on the actual length and width of the image that has been scanned and digitized, a file size of several megabytes (MB) can be created and used in the Post Script™ file. It is preferred that a four megabyte (4 MB) TIFF image that is not rotated and not scaled be made available for these tests, along with a similar eight megabyte (8 MB) file. For other tests, a four megabyte (4 MB) TIFF image file that is rotated by 15° is required, and additionally another four megabyte (4 MB) TIFF image file which has been scaled by a factor of one-hundred fifty percent (150%).

Besides files which have been created from images, PostScript™ files can also contain computer generated images, such as area of graduated fill, patterned fill, or radial fill printed graphics. A graduated fill area would typically comprise a rectangle of one solid color on one end which gradually changes to a second color at the opposite end. This second color may be white, such that the first color becomes lighter and lighter in color until it almost becomes white at the other end. Patterned and radial fills are alternative methods for filling areas with defined shapes or blending multiple colors. Since these types of computer generated images are quite common, it is important to provide data for the characterization tests that will include such information. It is preferred that a set of PostScript™ data be provided for a twenty square inch (20 in$^2$) graduated fill, and another set for an eighty square inch (80 in$^2$) graduated fill. In addition, it is preferred that a PostScript™ data set be provided for a twenty square inch (20 in$^2$) patterned fill, and a second set for an eighty square inch (80 in$^2$) patterned fill. It is also preferred that a PostScript™ data set be provided for a twenty square inch (20 in$^2$) radial fill, and a second set for an eighty square inch (80 in$^2$) radial fill.

The previously described TIFF image files and various fill-type files or data sets are used in the method of the present invention because it has been shown that in processing continuous images (also known as "contone" or "CT" images), rotation, scaling, and fills (including patterned, graduated, and radial-type fills) are the primary contributors to the amount of time required for a RIP process to take place. Other potential contributors to this time required for RIPing may include the total file size of the PostScript™ file, and the actual plate imaging time for each of the plates required for each page to be printed. All of these parameters are taken into account in the method of the present invention. These secondary factors (i.e., overall file size and plate imaging time) can become important if none of the other, above contributors dominate the RIPing time.

Flow chaff 10 (See FIG. 1) begins with a function block 12 which requires a RIP (Raster Image Processing) to be performed on a four megabyte (4 MB) TIFF image file that is non-rotated and non-scaled. This test should be performed using the actual Raster Image Processing apparatus which will be used to convert the PostScript™ data to bitmapped data for the actual magazine or book to be printed for production purposes. The amount of time to RIP the four megabyte (4 MB) file preferably will be temporarily stored in memory of the computer that is performing the method of flow chart 10.

After the above test has been completed, another function block 14 will perform a RIP on the eight megabyte (8 MB) TIFF image file, which is also non-rotated and non-scaled. The time required to RIP the eight megabyte (8 MB) file will also be stored in memory of the same computer, and will be somewhat longer than the time that was required to RIP the four megabyte (4 MB) file. Once these two RIPing times are available, function block 16 can calculate a value of the slope of RIP time per megabyte file size, which is given the variable name F1 on FIG. 1.

If, for example, the time required to RIP the four megabyte (4 MB) file was twenty (20) seconds, and the time to RIP the eight megabyte (8 MB) file was forty (40) seconds, then it is apparent that the time for RIPing one megabyte (1 MB) of these test files is approximately five seconds. The intercept, however, along the time axis of a X-Y chart is not always zero (0), so it is important to use two test files as per the method in flow chart 10. In a second example, the time for RIPing a four megabyte (4 MB) file could be thirty (30) seconds, and the time to RIP a eight megabyte (8 MB) file could be fifty (50) seconds. If the fifty seconds are divided by eight megabytes (8 MB), the value calculated is 6.33 seconds per megabyte, which would not be accurate. In reality, there usually is a certain amount of minimum time required to RIP any TIFF image file, regardless of its size, and as larger TIFF image files are being RIPed, it is more accurate to portray the amount of time, in seconds per megabyte, by the difference between the two test files at four megabytes (4 MB) and eight megabytes (8 MB). In this second example, there are twenty (20) seconds between the four megabyte (4 MB) value and the eight megabyte (8 MB) value, thereby leading to the slope of five (5) seconds per megabyte of RIP time. This value is much more accurate for use as a multiplying factor to be used with much larger TIFF image files.

The next step is function block 18, in which a RIP is performed on a four megabyte (4 MB) TIFF image file that is non-scaled, but it is rotated by 15°. Since TIFF image files can be rotated by any angle, a four megabyte (4 MB) TIFF image file will have a certain longer or shorter RIP time for each of those angles. However, a TIFF image file that has been rotated by 15° represents a typical value with respect to RiPing time as compared to rotated TIFF image files of all other angles. The accuracy tradeoff is around five percent (5%) maximum for this generalization, but since the method of the present invention is to merely estimate the time for RIPing TIFF image files, this is quite acceptable within the principles of the present invention. The time required to RIP the rotated four megabyte (4 MB) image file is divided, in function block 20, by the time to rotate the original four megabyte (4 MB) TIFF image file, which was performed in function block 12. This ratio will reveal a multiplication factor that represents the additional time for RIPing a rotated file, known as variable F2 in function block 20 of FIG. 1.

Another variation in TIFF image files is to have a scaled image, which either expands or contracts an image's size by a certain percentage. In function block 22, a four megabyte (4 MB) TIFF image file that is non-rotated, but has been scaled by a factor of 150% is RIPed, and the time for that to occur will be somewhat longer than the time to RIP a non-scaled four megabyte (4 MB) TIFF image file. In function block 24, the time value required to RIP the four megabyte (4 MB) scaled file is divided by the time required to RIP the-four megabyte (4 MB) TIFF image file that was performed in function block 12. This ratio provides a factor which can be used for any scaled TIFF image file that is to be RIPed, and is given the variable name F3, on FIG. 1.

At this point, flow chaff 10 has performed tests on four different types of TIFF image files (in function blocks 12, 14, 18, and 22), and has calculated RIP time values for each of the three test cases in function blocks 16, 20, and 24. This series of function steps is all that is required in the characterization tests of flow chart 10 for image files. The later steps of flow chart 10 are concerned with either computer generated files, or for certain operations that require RIPing time merely due to the fact of a file's size or other minimum execution time constraints.

In function block 26, a PostScript™ file for a twenty square inch (20 in$^2$) graduated fill is RIPed to find how much time that process will take. Continuing on, function block 28 performs a RIP on a similar graduated fill of eighty square inches (80 in$^2$). Function block 30 then compares the time required to perform the RIPs of function blocks 28 and 26, and arrives at a slope that represents a generalized period of time per unit area to RIP a graduated fill, which is given the variable name F4 on FIG. 1. As in function block 16, two different data sets are required (one at twenty square inches (20 in$^2$), and one at eighty square inches (80 in$^2$)) to arrive at this value per unit area, because the line drawn on an X-Y chart would probably not intercept the timing axis at zero. In other words, as in the time to perform a RIP on a TIFF image file, there is a certain minimum amount of time required to RIP a graduated fill, regardless of how small an area that is to be filled. This "zero-based" time is ignored at function block 30, however, this and other of the "minimum" times will be accounted for in later steps of the method of the present invention.

Function blocks 32, 34, and 36 are used to calculate a generalized value in time per unit area to RIP a patterned fill. Function block 32 performs a RIP on a twenty square inch (20 in$^2$) patterned fill, and function block 34 performs a RIP on an eighty square inch (80 in$^2$) patterned fill. The two times generated by function blocks 32 and 34 are used to determine the slope between those two area patterned fills and provide a generalized calculated value of time per unit area, in function block 36, to RIP a patterned fill, which is given the variable name F5 on FIG. 1.

Function blocks 38, 40, and 42 are used to calculate a generalized value of time per area to RIP a radial fill. Function block 38 performs a RIP on a twenty square inch (20 in$^2$) radial fill, and function block 40 performs a RIP on an eighty square inch (80 in$^2$) radial fill. The two times generated by function blocks 38 and 40 are used to calculate a value of the slope which is indicative of the generalized time per unit area to RIP a radial fill. This calculation takes place in function block 42, and its result is given the variable name F6 on FIG. 1.

Function blocks 44, 46 and 48 are used to calculate a generalized value of minimum time per file size (in megabytes) to RIP a PostScript™ file. Function block 44 performs a RIP on a 200 kilobyte (200 KB) PostScript™ file, and function block 46 performs a RIP on a one megabyte (1 MB) PostScript™ file. The two RIPing times generated by function blocks 44 and 46 are used to calculate a value, in function block 48, that represents a generalized minimum required time per megabyte to RIP any PostScript™ file on this particular Raster Image Processing apparatus. This calculated value is given the variable name F7 on FIG. 1.

Function block 50 is used to measure information received from the system user concerning the amount of time required for imaging one plate of film. This information is typically available in the pre-printing process utilizing this type of equipment, and is a direct user input via the computer's keyboard. On FIG. 1 this timing information is given the variable name F8, and is used in a later function step to determine the time for imaging all plates required in an actual data structure or file to be processed.

By the end of execution of flow chart 10 all the information required for the characterization test has been calculated and placed into memory of the system's computer as a timing data profile (a test data structure or file). The first seven function blocks were used to determine typical values for TIFF image files, and the next nine function blocks were used to determine typical timing information for computer generated image files. The last function blocks in flow chart 10 were used to provide information regarding the minimum times required to perform certain functions. Generally speaking, the timing values of F7 and F8 (from function blocks 48 and 50, respectively) will be quite small as compared to the amount of time required in an overall RIPing procedure. However, at this point the characterization tests provided by flow chart 10 cannot yet inform the system user whether or not timing values F7 and F8 are going to be very important, because the actual production job data has yet to be tested by the method of estimated RIPing time according to the present invention. The actual data structure or file that is to be processed (typically a page description language file) will be handled by a second flow chart 60, depicted in FIG. 2.

In function block 62, the actual data structure or file to be processed is sampled or inspected to determine certain information, such as the number of CT (continuous tone) images, the number of fills, the number of plates required for the job, and the total size of the file itself. At this point, the actual file to be processed preferably is a PostScript™ file, and must be RIPed to become a bitmapped file useful for making a film (from which plates can be made). Decision block 64 ascertains whether or not there are any CT images in the file being processed. If the answer is "Yes", the flow continues to function block 66.

In function block 66, each CT image is sampled or inspected to find its size (in kilobytes or megabytes), and whether its image is either scaled or rotated. After these determinations have been made, function block 68 groups each CT image into one of four categories: (1) CT image file that is neither scaled or rotated; (2) a CT image that is both scaled and rotated; (3) a CT image that is scaled but not rotated; and (4) a CT image that is rotated but not scaled.

Function block 70 calculates the size of each CT image file from the PostScript™ file data, preferably using the ALD (OPI) comments, or from the "BeginBinary" comment. These comments are part of a typical PostScript™ file. The size of each CT image from this file data is given the variable name V1 in FIG. 2. Variable V1 will remain unmodified if the CT image is neither scaled nor rotated.

Figure 2:
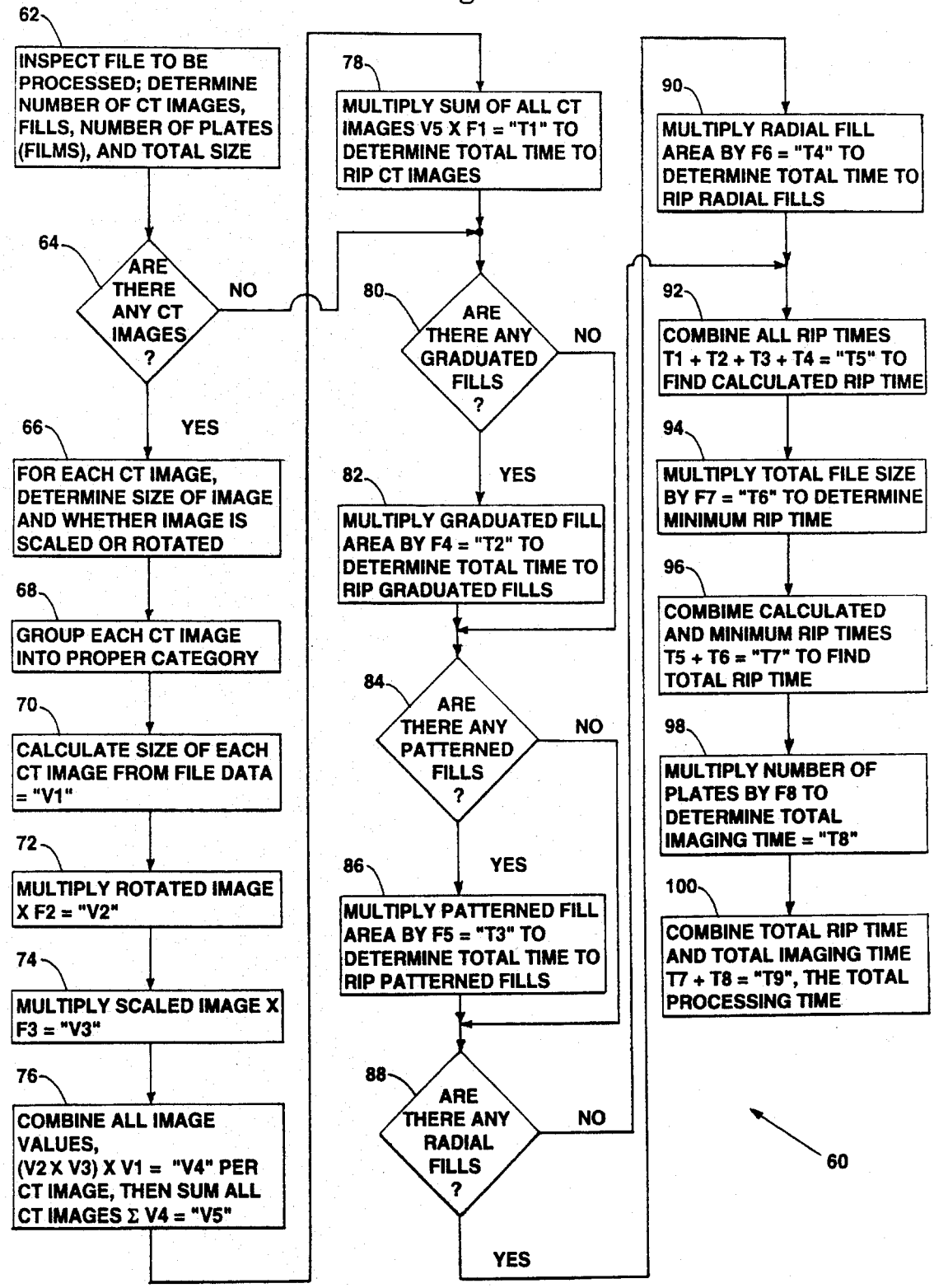
FIG. 2 is a flow chart depicting a series of function blocks and decision blocks that are required to perform the method of estimating total processing time according to the principles of the present invention.

Function block 72 is used to multiply the size of a rotated CT image file by the factor F2, providing a new variable V2 on FIG. 2. Function block 74 is used to multiply a scaled CT image by the factor F3, providing a new variable V3 on FIG. 2. It will be understood that for a CT image file which is both rotated and scaled, the size of that CT image file will be multiplied by both F2 and F3 before departing from function block 74.

In function block 76, the effective values of all CT image files is combined to provide a new variable V4 per CT image. The effective size of all of the CT images is then summed together to create a new variable V5 on FIG. 2. In function block 78, the effective size of all CT images combined (variable V5) is multiplied by the factor F1, which represents the calculated value in RIP time per megabyte of CT image file size. This calculation provides a new variable T1, which represents the total time for RIPing all CT images in the file to be processed. In this manner, the scanned image portion of the actual data structure or file to be processed is compared to the test data structure or file (i.e., the timing data profile) created by executing flow chart 10, thereby determining a portion of an estimated first time period for image processing.

In decision block 80, it is determined whether or not there are any graduated fills in the file to be processed. If the answer is "Yes", the flow continues to function block 82 which multiplies the graduated fill area (determined from the PostScript data file) by the factor F4 (the calculated generalized time per unit area to RIP a graduated fill) and provides a new variable T2. Time T2 represents the total time to RIP the entire sum of all of the graduated fills in the file to be processed.

In decision block 84, it is determined whether or not there are any patterned fills in the file to be processed. If the answer is "Yes", the flow continues to function block 86 which multiplies the patterned fill area (determined from the PostScripff data file) by the factor F5 (the calculated generalized time per unit area to RIP a graduated fill) and provides a new variable T3. Time T3 represents the total time to RIP the entire sum of all of the patterned fills in the file to be processed.

In decision block 88, it is determined whether or not there are any radial fills in the file to be processed. If the answer is "Yes", the flow continues to function block 90 which multiplies the radial fill area (determined from the PostScripff data file) by the factor F6 (the calculated generalized time per unit area to RIP a radial fill) and provides a new variable T4. Time T4 represents the total time to RIP the entire sum of all of the radial fills in the file to be processed.

Function block 92 combines all of the RIP times that have been calculated so far in flow chart 60. These RIP times include T1 (time to RIP all CT images), T2 (time to RIP all graduated fills), T3 (time to RIP all patterned fills), and T4 (time to RIP all radial fills). This summation is given the new variable name T5, on FIG. 2. In this manner, the computer generated image portion of the actual data structure or file to be processed is compared to the test data structure or file (i.e., the timing data profile) created by executing flow chart 10, thereby determining another portion of an estimated first time period for image processing.

Function block 94 measures the total file size, determined in function block 62, and multiplies it by factor F7 to provide a new variable T6. Time T6 is a portion of an estimated second time period that represents the minimum RIP time if there were virtually no CT images or computer generated images. Time T6 represents all of the data in the file to be processed, including text, lines, and boxes that are to be placed on the pages of the printed document. As related above, time T6 is generally much smaller in value than time T5.

Function block 96 combines the calculated and minimum RIP times, T5 and T6, respectively, and creates a new variable T7. Variable T7 represents the total time to RIP the file to be processed.

Function block 98 takes the number of plates, determined by function block 62, and multiplies them by factor F8 to determine the total imaging time, creating a new variable T8. Time T8 is a portion of an estimated second time period that represents the minimum time required to create one of the four color plates for a particular page, regardless of how simple that particular plate may be. It is physically impossible to make a plate in zero time, and variable T8 represents that realization. Function block 100 combines the total RIPing time T7 and the total imaging time T8 and creates a new variable T9. Variable T9 represents an estimate of the total processing time for the file that is to be put into printed production.

Once variable T9 has been determined, its value may be stored on a magnetic or optical disk that is interfaced with a computer, displayed on an associated monitor and/or printed on an associated printer. The preceding time variables (e.g., T1 through T8) can also be similarly stored, displayed, and/or printed, as per the user's needs. This information is valuable to the user (particularly to a service bureau) who is in business to provide raster image processing services to publishers or other customers that create page description language files, and then need the corresponding document printed. With accurate time estimates for RIPing customer's files, the service bureau can keep better control over scheduling of its RIP equipment to handle the actual RIPs as part of its production schedule. Before the present invention was available, such estimates were merely guesswork based upon experience, however, such estimates were quite often very inaccurate. After all, without actually sampling the actual data structure or file to be printed, one cannot really determine all the steps that will be required during the actual RIP. Overlays, for example, can greatly lengthen the RIP time, and such overlays are not apparent from a mere inspection of the artwork displayed on a monitor by the PostScript™ language computer program.

It will be understood that the timing data profile can be created either by a user (the "service bureau"), or by a manufacturer of the RIP apparatus and computer program interpreter. If a user can perform the method steps of flow chart 10 upon a set of test data files to create the timing data profile, then a RIP manufacturer could obviously perform the same method at the factory and provide the results (variables F1, F2, F3, F4, F5, F6, F7, and F8) to its users, thereby saving the user's effort. In addition, it will be understood that the empirical method of flow chart 10 could be replaced by an algorithm which calculates values for variables F1 through F8. Such calculated values would likely be available to a RIP manufacturer, since that manufacturer would have intimate knowledge of the workings of its own RIP computer program interpreter. The variable values F1 through F8 could similarly be provided to the manufacturer's users, again saving efforts by the users.

It will also be understood that a stand-alone prim-processing apparatus that can create a page description language file and directly output a color printed page may also benefit from the principles of the present invention. Any such apparatus must interpret the code of the page description language file, which will require a significant amount of time that desirably would be known in advance. Rather than RIPing the page description language file into a format used to create films, the apparatus would directly print the desired color document. The time to perform this function can be estimated by using the principle of the present invention to create a timing data profile based upon test data. As in the case of a RIP device that interprets PostScript™ code, the stand-alone apparatus could either empirically or algorithmically create the timing data profile to be used in the estimation procedure.

An example of such an above stand-alone apparatus is a Scitex workstation, which is available in versions having the product names Pixet™ and Prismax™. Each of these workstations can receive image data from optical scanners as well as create computer generated images, such as graduated fills. The Scitex workstation uses computer programs to create the necessary file formats, such as Scitex CT™ to create the contone page description language files (for scanned images) and Scitex LW™ to create the line work page description language files (for text, boxes, special lines, etc.). A Scitex "RIP"-type computer program known as Scitex Handshake™ combines the data of the above two "CT" and "LW" files. After this has occurred, the information is presented to the output device (the printer), which preferably is a Kodak Approval™ color proofer, which produces direct color output. It will be understood that the time required to combine the data, using Scitex Handshake™, and the time to present data to the Kodak Approval™ and print the color document either could be individually estimated or combined into one time period estimation.

In a similar manner to the method related above, flow charts 10 and 60 can be used to estimate the time required for a stand-alone apparatus (such as the Scitex workstation) to process the input data and to output the printed document. Once the equivalent to a page description language timing data profile have been entered into the stand-alone apparatus, the function blocks of flow chart 10 can all be performed to create a timing data profile, by executing a RIP, or its equivalent procedure for that particular stand-alone apparatus. (Or, if the manufacturer of the stand-alone apparatus has supplied its user with calculated values for variables F1 through F8, then a timing data profile may already be available.)

The actual data files to be printed, once converted into the equivalent to page description language files as needed by the particular stand-alone apparatus, may then be analyzed by the steps of flow chart 60. The object of flow chart 60 is to determine the time to perform the actual RIP, or its equivalent procedure in this particular stand-alone apparatus, upon the actual data files to be printed. Since the stand-alone apparatus will be able to work with both contone images and computer generated images, all of the steps of flow chart 60 would be useful in determining the RIPing (or its equivalent) time. In addition, the time for actually printing each page of the printed document would be of interest for the stand-alone apparatus. This actual printing time could additionally be estimated by combining an additional time element in function block 48 to take into account the time to print per MB, then including that additional time element in function blocks 94, 96, 98, and 100. In this manner, the actual printing time could be accounted for and estimated.

It may be desirable to estimate the time required to apply a filter to an image to create a special effect, such as a paint brush stroke, or a charcoal or embossed appearance. Such filtering processes generally occur in two steps: (1) producing the special effect, and (2) creating a final data format. Examples of presently available products that perform such filtering processes are Adobe Photoshop™ and Aldus Gallery Effects™.

The principles of the present invention could be utilized to estimate the time required to produce the special effect, certain function steps of flow chart 10 would be implemented, particularly the applicable steps involving imaged data (function blocks 12, 14, 16, 18, 20 22 and 24). Function blocks 4.4, 46, 48 and 50 would also provide useful information in this application. The applicable function blocks of flow chart 60 would also be used, particularly those involving CT images (function blocks 62, 66, 68, 70, 72, 74, 76 and 78). Of course, rather than estimating the time to RIP the data, the method in this application would estimate the time to perform the special effect. If the final data format, once created, is additionally to be RIPed, then flow charts 10 and 60 can be directly used as previously related, hereinabove.

Other special effects include adding a pencil-stroke effect, a water color effect, and a metallized effect (where a photograph appears to be stamped in metal). Each of these special effects, and others, can be characterized and profiled using the principles of the present invention, then have their actual processing time estimated.

Another special effect, known as "rendering" creates a three-dimensional ("3D") effect from a two-dimensional ("2D") image. This procedure begins with a file of image data comprising 2D elements and adds the effects of depth, texture, shadowing, and/or light sources at given angles. One presently available product that produces rendering effects is Pixar Renderman™. Each of these special effects contains elements that can be characterized and profiled using the principles of the present invention, and have their actual processing time estimated. In flow chart 10, the applicable steps to be implemented would include the imaged data steps, such as function blocks 12, 14, 16, 18, 20, 22 and 24. Instead of performing a RIP (at function blocks 12, 14, 18, and 22), however, the given special effect would be performed, such as depth or shadowing. In addition, the applicable function blocks of flow chart 60 would also be used to estimate rendering time, particularly those involving CT images (function blocks 62, 66, 68, 70, 72, 74, 76 and 78).

Other applications which may benefit from the principles of the present invention are certain post-processing steps such as image enhancement. In a post-processing step, the RIP has already occurred and access to full data is available (every sample in the data file can be inspected by the processing apparatus). For example, if a raw data infrared image is available, its color or gray scale data picture element (pixel) values are known, and can be operated upon by the post-processing apparatus. One application using such infrared images is to make false colors to enhance certain infrared frequency ranges or to enhance the contrast between intensities of the raw data. Another application is to "colorize" a gray scale data (black-and-white) image to achieve the same effects (to enhance certain infrared frequency ranges or to enhance the contrast between intensities of the raw data).

It may be desirable to know the estimated time to perform post-processing steps, since such steps may require significant "number-crunching" in terms of computer execution time. The elements involved in any post-processing step can be characterized and profiled using the principles of the present invention, and have their actual processing time estimated. In flow chart 10, the applicable steps to be implemented would include the imaged data steps, such as function blocks 12, 14, 16, 18, 20, 22 and 24. Instead of performing a RIP (at function blocks 12, 14, 18, and 22), however, the given post-processing algorithm would be performed, such as colorizing or enhancing contrast between pixels. The applicable function blocks of flow chart 60 would also be used to estimate the post-processing time (rather than RIPing time), particularly those function blocks involving CT images (function blocks 62, 66, 68, 70, 72, 74, 76 and 78).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for determining an estimated amount of time required to complete raster image processing of an actual page description language file having a predetermined size, without performing actual raster image processing of the actual page description language file, comprising the steps of:

(a) providing a test data file that includes a first non-rotated, non-scaled image file, a rotated, non-scaled image file, a non-rotated, scaled image file, each of these files having substantially the same file size, and a second non-rotated, non-scaled image file of a different file size;

(b) performing raster image processing on each of said above files, performing raster image processing on each of two graduated fills of two different areas, performing raster image processing on each of two patterned fills of two different areas, performing raster image processing on each of two radial fills of two different areas, and performing raster image processing on each of two page description language files of two different file sizes, thereby creating a timing data profile that includes performance information in units of processing time per file size for each type of said above files, including image files and page description language files, and in units of processing time per unit area for each of said above types of fills, including a graduated fill, a patterned fill, and a radial fill;

(c) examining said actual page description language file by determining, for each image of said actual page description language file, its size, whether it is scaled or non-scaled, and whether it is rotated or non-rotated, and determining the area for each computer generated graduated fill, patterned fill, and radial fill;

(d) determining the total combined size of all image files of the actual page description language file and multiplying said total combined size by said performance information of the timing data profile in processing time per file size, and determining the total combined area of all computer generated fills by respective type and multiplying said total combined area by said performance information of the timing data profile in processing time per unit area by respective type, thereby creating an estimated first time period;

(e) measuring the size of said actual page description language file and multiplying said actual page description language file size by said performance information the timing data profile in said page description language file processing time per file size, thereby creating an estimated second time period; and (f) combining said first time period and said second time period to create an estimate of the total time required to complete raster image processing.

2. The method as recited in claim 1, further comprising the step of communicating said total time to one of:

a storage device and a peripheral device.

3. The method as recited in claim 1, wherein said test data file comprises at least one of:

first graphical imaged data, first scanned image data, first computer generated image data, first contone image data, and first vector image data, and wherein said actual page description language file comprises at least one of:

second graphical imaged data, second scanned image data, second computer generated image data, second contone image data, and second vector image data.

4. The method as recited in claim 3, wherein said test data file and said page description language file each comprise an encapsulated PostScript file.

5. The method as recited in claim 1, wherein said actual page description language file size comprises at least one of:

the amount of text information, amount of plate imaging information, and number of plates.

6. The method as recited in claim 1, wherein the steps of providing a test data file, performing raster image processing and creating a timing data profile comprise:

(a) performing raster image processing on a first non-rotated, non-scaled image file having a first file size, thereby creating a first time interval;

(b) performing raster image processing on a second non-rotated, non-scaled image file having a second file size, said second file size being larger than said first file size, thereby creating a second time interval;

(c) determining, from the values of said first and second time intervals and first and second file sizes, a value of raster image processing time per megabyte image file size;

(d) performing raster image processing on a third rotated, non-scaled image file having said first file size, thereby creating a third time interval;

(e) determining, from the values of said first and third time intervals, a first factor;

(f) performing raster image processing on a fourth non-rotated, scaled image file having said first file size, thereby creating a fourth time interval;

(g) determining, from the values of said first and fourth time intervals, a second factor;

(h) performing raster image processing on a first graduated fill having a first area, thereby creating a fifth time interval;

(i) performing raster image processing on a second graduated fill having a second area, said second area being larger than said first area, thereby creating a sixth time interval;

(j) determining, from the values of said fifth and sixth time intervals and first and second areas, a value of raster image processing time per unit graduated fill area;

(k) performing raster image processing on a first patterned fill having a third area, thereby creating a seventh time interval;

(l) performing raster image processing on a second patterned fill having a fourth area, said second area being larger than said first area, thereby creating a eighth time interval;

(m) determining, from the values of said seventh and eighth time intervals and third and fourth areas, a value of raster image processing time per unit patterned fill area;

(n) performing raster image processing on a first radial fill having a fifth area, thereby creating a ninth time interval;

(o) performing raster image processing on a second radial fill having a sixth area, said second area being larger than said first area, thereby creating a tenth time interval;

(p) determining, from the values of said ninth and tenth time intervals and fifth and sixth areas, a value of raster image processing time per unit radial fill area;

(q) performing raster image processing on a first page description language file having a third file size, thereby creating an eleventh time interval;

(r) performing raster image processing on a second page description language file having a fourth file size, said fourth file size being larger than said third file size, thereby creating a twelfth time interval; and (s) determining, from the values of said eleventh and twelfth time intervals and third and fourth file sizes, a value of raster image processing time per megabyte page description language file size.

7. The method as recited in claim 6, wherein the step of examining said actual page description language file further comprises:

(a) determining the area for each graduated fill of said actual page description language file;

(b) determining the area for each patterned fill of said actual page description language file; and (c) determining the area for each radial fill of said actual page description language file.

8. The method as recited in claim 7, wherein the step of determining the total combined size of all image files of said actual page description language file comprises:

(a) determining the total combined size of all non-rotated, non-scaled image files of said actual page description language file, thereby creating a first image size element;

(b) determining the total combined size of all rotated, non-scaled image files of said actual page description language file, multiplying said total combined size by said first factor, and thereby creating a second image size element;

(c) determining the total combined size of all scaled, non-rotated image files of said actual page description language file, multiplying said total combined size by said second factor, and thereby creating a third image size element;

(d) determining the total combined size of all scaled and rotated image files of said actual page description language file, multiplying said total combined size by said first and second factors, and thereby creating a fourth image size element;

(e) summing said first, second, third, and fourth image size elements to create a fifth image size element multiplying said fifth image size element by said raster image processing time per image file size, thereby creating a thirteenth time interval;

(f) determining the total combined areas of all graduated fills of said actual page description language file, multiplying said total combined areas by said raster image processing time per unit graduated fill area, thereby creating a fourteenth time interval;

(g) determining the total combined areas of all patterned fills of said actual page description language file, multiplying said total combined areas by said raster image processing time per unit patterned fill area, thereby creating a fifteenth time interval;

(h) determining the total combined areas of all radial fills of said actual page description language file, multiplying said total combined areas by said raster image processing time per unit radial fill area, thereby creating a sixteenth time interval; and (i) summing said thirteenth, fourteenth, fifteenth, and sixteenth time intervals, thereby creating said first time period.

9. The method as recited in claim 8, wherein the step of measuring the size of said actual page description language file comprises:

(a) determining the total file size of said actual page description language file, multiplying said total file size by said raster image processing time per page description language file size, thereby creating a seventeenth time interval;

(b) determining the time required for imaging one plate of film, determining the total number of plates required by said page description language file, multiplying said total number of plates by said time for imaging one plate, thereby creating an eighteenth time interval; and (c) summing said seventeenth and eighteenth time intervals, thereby creating said second time period.

10. The method as recited in claim 9, wherein the step of combining said first and second time periods comprises summing said first time period and said second time period, thereby creating said total time required to complete raster image processing.

11. The method as recited in claim 10, further comprising the step of communicating said total time to one of:

a storage device and a peripheral device.

12. A method for determining an estimated amount of time required to complete raster image processing of an actual page description language file having a predetermined size without performing actual raster image processing off the actual page description language file, comprising the steps of:

(a) providing a manufacturer's data file that includes performance information for a first non-rotated, non-scaled image file, a rotated non-scaled image file, a non-rotated, scaled image file, each of these files having substantially the same file size, and a non-rotated, non-scaled image file of a different file size, two graduated fills of two different areas, two patterned fills of two different areas, two radial fills of two different areas, and two page description language files of two different file sizes, thereby creating a timing data profile that includes performance information in units of processing time per file size for each type of said above files, including image files and page description language files, and in units of processing time per unit area for each of said above types of fills, including a graduated fill, a patterned fill, and a radial fill;

(b) examining said actual page description language file by determining, for each image of said actual page description language file, its size, whether it is scaled or non-scaled, and whether it is rotated or non-rotated, and determining the area for each computer generated graduated fill, patterned fill, and radial fill;

(c) determining the total combined size of all image files of the actual page description language file and multiplying said total combined size by said performance information of the timing data profile in processing time per file size, and determining the total combined area of all computer generated fills by respective type and multiplying said total combined area by said performance information of the timing data profile in processing time per unit area by respective type, thereby creating an estimated first time period (d) measuring the size of said actual page description language file and multiplying said actual page description language file size by said performance information of the timing data profile in said page description language file processing time per file size, thereby creating an estimated second time period; and (e) combining said first time period and said second time period to create an estimate of the total time required to complete raster image processing.

\* \* \* \* \*

UNITED STATES PATENT AND TRADEMARK OFFICE
CERTIFICATE OF CORRECTION

PATENT NO. : 5,473,741
DATED : December 5, 1995
INVENTOR(S) : Thomas J. Neufelder and Ann M. Neufelder It is certified that error appears in the above-indentified patent and that said Letters Patent is hereby corrected as shown below:

Column 14, line 38 (claim 1), after "information" insert --of--.

Column 14, line 67 (claim 6), after "processing" insert --,--.

Column 15, line 11 (claim 6), after "per" delete --megabyte--.

Column 16, line 1 (claim 6), after "per" delete --megabyte--.

Column 16, line 36 (claim 8), after "element" insert --,--.

Column 16, line 41 (claim 8), "nml-" should read --mul---.

Column 17, line 18 (claim 12), "off" should read --of--.

Column 17, line 26 (claim 12), after "a" insert --second--.

Column 18, line 21 (claim 12), after "period" insert --;--.

Signed and Sealed this

Twenty-third Day of July, 1996

*Attest:*

BRUCE LEHMAN

*Attesting Officer*         *Commissioner of Patents and Trademarks*